United States Patent
Hamaguchi

[19]

[11] Patent Number: 5,959,437
[45] Date of Patent: *Sep. 28, 1999

[54] CHARGE AND DISCHARGE CONTROL CIRCUIT

[75] Inventor: Masanao Hamaguchi, Chiba, Japan

[73] Assignee: Seiko Instruments Inc., Japan

[*] Notice: This patent issued on a continued prosecution application filed under 37 CFR 1.53(d), and is subject to the twenty year patent term provisions of 35 U.S.C. 154(a)(2).

[21] Appl. No.: 09/020,710

[22] Filed: Feb. 9, 1998

[30] Foreign Application Priority Data

Feb. 10, 1997 [JP] Japan ................................. 9-027039

[51] Int. Cl.$^6$ ........................................................ H02J 7/00
[52] U.S. Cl. .......................... 320/134; 320/164; 320/155
[58] Field of Search .................................... 320/164, 162, 320/163, 146, 155, 157, 158, 159, 128, 132, 133, 134, DIG. 13

[56] References Cited

U.S. PATENT DOCUMENTS

| | | | |
|---|---|---|---|
| 5,493,197 | 2/1996 | Eguchi et al. | 320/134 |
| 5,547,775 | 8/1996 | Eguchi et al. | 320/116 |
| 5,703,463 | 12/1997 | Smith | 320/134 |
| 5,742,148 | 4/1998 | Sudo et al. | 320/134 |
| 5,796,240 | 8/1998 | Saito et al. | 322/10 |

*Primary Examiner*—Peter S. Wong
*Assistant Examiner*—K. Shin
*Attorney, Agent, or Firm*—Adams & Wilks

[57] ABSTRACT

To obtain a required delay time at each control using one capacitor in common, a charge and discharge control circuit includes an overcharge detecting circuit, an overdischarging circuit, and an overcurrent detecting circuit and carries out charge and discharge control of a secondary cell by ON/OFF control. A delay circuit includes plural current sources or a resistor and a single capacitor to obtain a varying delay time in response to a signal from outside. The charge and discharge control circuit operates the delay circuit so that a required delay output is obtained from the delay circuit by a first control circuit and ON/OFF controls a switch circuit by a second control circuit so that a required charge and discharge control is carried out with delay by the delay output.

4 Claims, 4 Drawing Sheets

FIG.3

| | A | B | C | A' | B' | C' | A" | B" | C" | D |
|---|---|---|---|---|---|---|---|---|---|---|
| USUALLY | L | L | L | L | L | L | L | L | L | (ON) H |
| AFTER OVERCHARGE PROTECTING OPERATION | H | L | L | H | L | L | H | L | L | H |
| AFTER OVERDISCHARGE PROTECTING OPEVATION | L | H | L | L | H | L | L | H | L | (OFF) L |
| AFTER OVERCURRENT PROTECTING OPERATION | L | L | H | L | L | H | L | L | H | L |
| AFTER OVERCHARGE AND OVERCURRENT PROTECTING OPERATION | H | L | H | L | L | H | L | L | H | L |
| AFTER OVERDISCHARGE AND OVERCURRENT PROTECTING OPERATION | L | H | H | L | L | H | L | L | H | L |
| AFTER OVERCHARGE AND OVERDISCHARGE PROTECTING OPERATION | — | — | — | — | — | — | — | — | — | — |

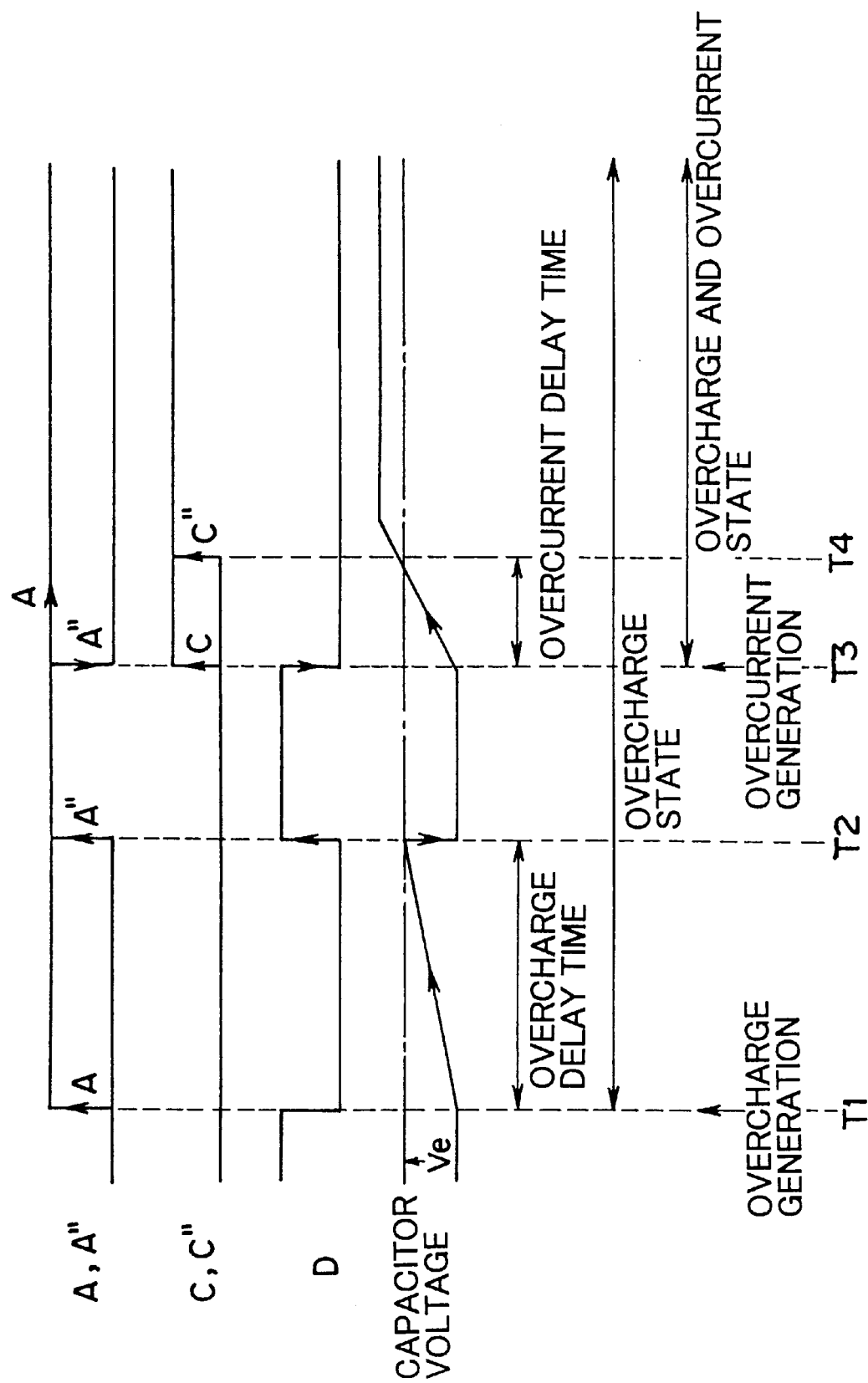

CHARGE AND DISCHARGE CONTROL CIRCUIT

BACKGROUND OF THE INVENTION

The present invention relates to a charge and discharge control circuit controlling charge and discharge of a secondary cell by ON/OFF of a switch circuit.

A charge and discharge control circuit has been disclosed in the prior art, in which a switch circuit is connected to a secondary cell in series and the switch circuit is controlled by ON/OFF control to control charge and discharge of the secondary cell thereby. For example, in controlling charge and discharge of a lithium ion cell, whether the terminal voltage of the lithium ion cell is more than the predetermined level is detected comparing voltage by a comparator. When it is detected that the terminal voltage is more than the predetermined level, the switch element of the switch circuit is turned OFF so as to stop charge. The above construction is introduced in general. As the result, overcharge state is surely detected and charge to the secondary cell is controlled so that the secondary cell does not become the overcharge state not responding the transient change of cell voltage. Although control to stop current supply from the secondary cell to the load detecting overdischarge and control to stop current supply from the secondary cell to the load detecting overcurrent are carried out similarly in the charge and discharge control circuit, the delay circuit are used respectively by the similar reason in those controls.

Therefore, in the prior charge and discharge control circuit like this, it needs to form a delay circuit respectively in each of the overcharge detecting circuit, overdischarge detecting circuit, and overcurrent detecting circuit, and a capacitor for setting delay time is formed respectively in three delay circuits. In this manner, as the capacitor for setting delay time on each control is needed at each delay circuit, the charge and discharge control circuit causes increase cost thereof and has a problem to increase the mounting area.

An object of the present invention therefore is to solve these problems in the prior art and to provide a charge and discharge control circuit obtaining required delay time at each control using one capacitor in common.

SUMMARY OF THE INVENTION

To solve the above problems, the charge and discharge control circuit of the present invention controls a charge and discharge of a secondary cell connected to an external power source terminal through a switch circuit by ON/OFF controlling said switch circuit and further includes an overcharge detecting circuit for detecting whether the secondary cell is in the overcharge state, an overdischarge detecting circuit for detecting whether the secondary cell is in the overcharge state, an overcurrent detecting circuit for detecting whether overcurrent flows from the secondary cell to a load, a delay circuit including a plural of current sources or a resistor and a single capacitor to obtain selectively varying delay time responding to a signal from outside, a first control means for responding to each output of the overcharge detecting circuit, the overdischarge detecting circuit, and the overcurrent detecting circuit, and for operating the delay circuit so as to obtain a required delay output on different occasion, and a second control means for responding to the output of the first control means and the delay output from the delay circuit, and for outputting a control signal for ON/OFF controlling the switch circuit.

The first control means responds to each output of the overcharge detecting circuit, overdischarge detecting circuit, and overcurrent detecting circuit, operates the delay circuit so as to obtain the required delay output, and output the required delay output from the delay circuit. For example, when the overcharge state is detected of the secondary cell in the overcharge detecting circuit, the delay circuit is controlled so that the required delay output according to the overcharge detecting. The delay output is processed at the second control means so as to ON/OFF control the switch circuit needed for overcharge protect.

The control of the delay circuit by the first control means can be carried out following the predetermined control table. The ON/OFF control of the switch circuit by the second control means can be carried out similarly. Especially, when a plural of detecting outputs are obtained, the ON/OFF control of the switch circuit following the control table pre-set at the first and second control means so that the switch circuit becomes the best ON/OFF state according thereto.

BRIEF DESCRIPTION OF THE DRAWINGS

FIG. 3 is a view showing a control table of the first and the second control circuits of the control unit shown in FIG. 2.

FIG. 4 is a waveform diagram of a signal of each part for describing an example of operation in the charge and discharge control circuit shown in FIGS. 1 to 3.

DETAILED DESCRIPTION OF THE INVENTION

Referring figures, an embodiment of the present invention will be described bellow.

Figure 1:
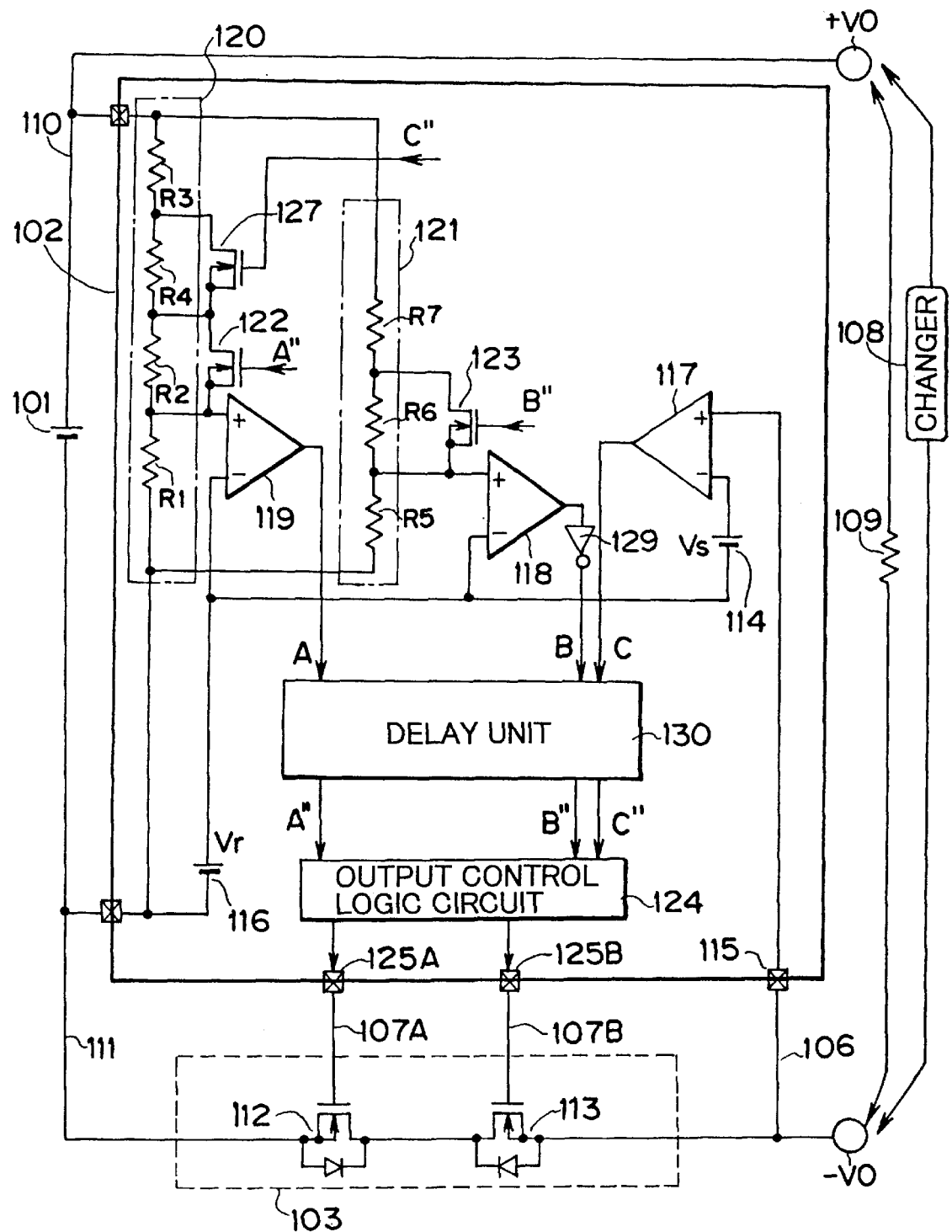
FIG. 1 is a circuit diagram showing an embodiment of a charge and discharge control circuit of the present invention.

FIG. 1 is a circuit block diagram of a charge and discharge control circuit of the present invention. A negative pole of a secondary cell 101 is connected to an external power source terminal −V0 through a switch circuit 103. The switch circuit 103 comprises two N-channel FETs, in the embodiment shown in the figure, an FET 112 for overdischarge control and overcurrent control is formed at the secondary cell 101, and an FET 113 for overcharge control is formed at the external power source terminal −V0. Voltage of the secondary cell 101 is detected by a charge and discharge control circuit 102 as described below, and the FETs 112 and 113 are ON/OFF controlled depending on the result detected. The charge and discharge control circuit 102 includes an overcharge detecting comparator 119, an overdischarge detecting comparator 118, a reference voltage circuit 116 for supplying predetermined reference voltage Vr to each input terminal of the overcharge detecting comparator 119 and the overdischarge detecting comparator 118, a voltage divider circuit 120 comprising resistors R1 to R4 for dividing the terminal voltage of the secondary cell 101, an another voltage divider circuit 121 comprising resistors R5 to R7 for dividing the terminal voltage of the secondary cell 101, a delay unit 130, and an output control logic circuit 124.

Two outputs from the output control logic circuit are connected to a terminals 125A and 125B respectively, and to each gate of the FETs 112 and 113 of the switch circuit 103 with signal lines 107A and 107B. An ON/OFF control signal is sent from the output control logic circuit 124 to the FETs 112 and 113. A charger 108 for charging the secondary cell 101 and a load 109 driven by the secondary cell 101 are connected between the external power source terminals +V0 and −V0.

The overcharge detecting comparator 119 has a function detecting an overcharge state comparing reference voltage Vr of the reference voltage circuit 116 with the divided output reflecting the terminal voltage of the secondary voltage 101 occurring at both terminals of the resistors R1 and R2 of the voltage divider circuit 120.

Output of the overcharge detecting comparator 119 becomes a high level state when a level of above-mentioned divided output voltage input to the plus input terminal of the overcharge detecting comparator 119 is more than the reference voltage Vr. Output A of the overcharge detecting comparator 119 is input to the delay unit 130, and when output A of the overcharge detecting comparator 119 turns high level from low level, output A of the delay unit 130 can change low level to high level with the predetermined delay time.

An FET shown with symbol 122 has a function to turn ON to short the resistor R2 when output A of the delay unit 130 becomes high level, to make level of the plus input terminal of the overcharge comparator 119, and to let operation of the overcharge detecting comparator 119 have hysteresis.

The overdischarge detecting comparator 118 has a construction detecting an overdischarge state comparing reference voltage Vr of the reference voltage circuit 116 with the divided output reflecting the terminal voltage of the secondary cell 101 occurring at both terminals of the resistor R5 of the voltage divider circuit 121.

Output of the overcharge detecting comparator 119 becomes low level state when a level of above-mentioned divided output voltage input to the plus input terminal of the overcharge detecting comparator 119 is more than the reference voltage Vr. An inverter circuit 129 is formed at output side of the overcharge detecting comparator 118, and output B changing low level to high level is output from the inverter circuit 129 when output of overdischarge detecting comparator 118 changes high level to low level, namely when the overdischarge state is detected. Output B is input to the delay unit 130, and when output B turns high level from low level for example, output B" of the delay unit 130 can change low level to high level with the predetermined delay time.

An FET shown with symbol 123 has a function to turn OFF to short the resistor R6 when output B of the delay unit 130 becomes high level, to make level of the plus input terminal of the overcharge detecting comparator 118 low, and to let operation of the overcharge detecting comparator 118 have hysteresis.

An overcurrent detecting comparator shown with symbol 117 detects whether overcurrent flows through the load responding to voltage of the external power source terminal −Vo obtained through a terminal 115. The plus input terminal of the overcurrent detecting comparator 117 is connected to a terminal 115 of the charge and discharge control circuit 102, a reference voltage circuit 114 is connected to a minus terminal thereof, and the reference voltage circuit 114 supplies the predetermined constant reference voltage Vs to the minus terminal of the overcurrent detecting comparator 117.

The overcurrent detecting by the overcurrent detecting comparator 117 operates as the following. When current flowing from the secondary cell 101 to the load 109 increases and becomes the overcurrent state, voltage drop occurring at the switch circuit 103 increases. When voltage level supplied to the plus input terminal of the overcurrent detecting comparator 117 is more than the reference voltage Vs supplied to the minus terminal thereof, output C of the overcurrent detecting comparator 117 becomes high level state. Output C of the overcurrent detecting comparator 117 is input to the delay unit 130, and when output C of the overcurrent detecting comparator 117 changes low level to high level for example, output C" of the delay unit 130 can change low level to high level with the predetermined delay time. An FET shown with symbol 127 has a function to turn ON to short the resistor R4 when output C of the delay unit 130 becomes high level, to make level of the plus input terminal of the overcurrent detecting comparator 117 high, and to let operation of the overcurrent detecting comparator have hysteresis.

The output control logic circuit 124 has a function for ON/OFF controlling the FETs 112 and 113 of the switch circuit 103 responding to outputs A", B", and C". In the embodiment shown in the figure, the output control logic circuit 124 has a function for turning the FET 113 OFF responding to high level of the output B and for turning the FET 112 OFF responding to high level of the output B" or C".

Figure 2:
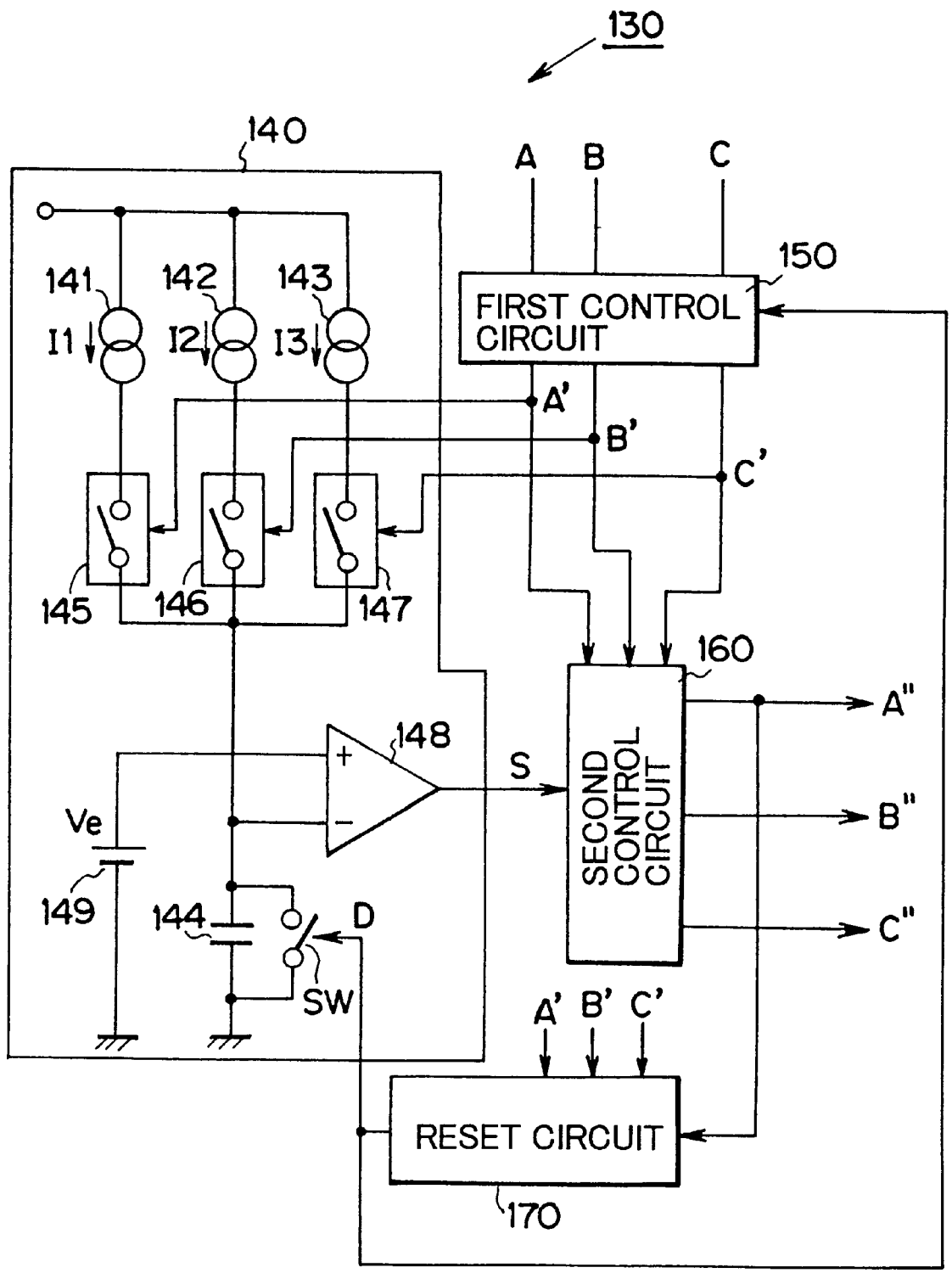
FIG. 2 is the detailed circuit diagram of the delay unit shown in FIG. 1.

Next, referring FIG. 2, the delay unit 130 will be described. The delay unit 130 has a delay circuit 140 for including a plural of current sources 141 to 143 and a single capacitor 144 and for obtaining alternatively three kinds of delay outputs S responding to a signal from outside, a first control circuit 150 for operating a delay circuit 140 so as to obtain the required delay output S on different occasion responding to outputs A, B, and C, and a second control circuit 160 for outputting control signals A", B", and C" to ON/OFF control the FETs 112 and 113 of the switch circuit 103 responding to outputs A', B', and C' of the first control circuit 150 and the delay output S.

The delay circuit 140 has usually opened switches 145 to 147 for connecting selectively each output of the constant current sources 141, 142, and 143 to the other terminal of the capacitor 144, one terminal of which is grounded. The usually opened switches 145 to 147 are connected between each output of the constant current sources 141, 142, and 143 and the capacitor 144 as shown in FIG. 2. The constant current sources 141, 142, and 143 have respectively varying constant currents I1 to I3, and voltage of the other terminal of the capacitor 144 rises at the predetermined curve as the time passes by closing of any of usually opened switches 145 to 147. The rising rate is determined by constant current of the constant current source connected to the capacitor 144. It is optional to select actually any circuit form because the constant current sources 141, 142, and 143 may have only function supplying the predetermined constant power source. Therefore, any of the constant current source and the resistor (time constant of CR) can construct the circuit.

Voltage of the other terminal of the capacitor is supplied to a minus input terminal of a voltage comparator 148. A reference voltage Ve is supplied to a plus input terminal of the voltage comparator 148, and low level delay output S is output when voltage of the other terminal of the capacity 144 rises and exceeds the reference voltage Ve. A switch shown with symbol SW discharges the electric charge of the capacitor 144, and is ON/OFF controlled by a reset signal D from a reset circuit 170. The reset circuit 170 outputs a reset signal responding outputs A" from the second control circuit 160 and output A', B', and C' from the first control circuit 150. The reset signal D is input to the first control circuit 150 too.

As the delay circuit 140 is constructed like above, in the state in which the electric charge of the capacitor 144 is discharged enough by the switch SW, when any switch of the constant current sources 141, 142, and 143 is closed by the first control circuit 150, voltage of the other terminal of the capacitor rises at the rising rate according to the switch selected by the first control circuit 150, and the delay output S is output after delay time according to the rising rate from the voltage comparator 148.

The first control circuit 150 responds to outputs A, B, and C and outputs A', B', and C' according to the predetermined control table so as to turn any of usually opened switches 145 to 147. It means that the first control circuit 150 determines the delay output time of the delay output S at that time in the delay circuit 140 responding to outputs A, S, and C.

An example of the control table is shown in FIG. 3. The following things are understood by FIG. 3: when only one of outputs A to C is output, corresponding outputs A' to C' becomes high level; when both of outputs A and C becomes high level, only output C' becomes high level; and when both of outputs B and C becomes high level, only output C' becomes high level.

Returning to FIG. 2, the second control circuit 160 responds to outputs A', B', and C' output from the first control circuit 150 as above-mentioned, and determines level states of outputs A", B", and C" according to the states of outputs A', B', and C' when the delay output is output.

FIG. 3 shows the control table for determine level states of outputs A", B", and C" and relation between the input A" of the reset circuit and a reset signal D in the second control circuit 160. In the embodiment, outputs A", B", and C" follows the logic of respectively corresponding outputs A', B', and C'. Although the reset circuit 170 ON/OF controls switch SW responding to output A" from the second control circuit 160 and outputs A', B', and C' from the first control circuit 150, the fundamental control is the following. The switch SW is usually ON and the capacitor is in discharge state. When any of usually opened switches 145 to 147 becomes ON, the switch SW is opened and delay operation by charge operation to the capacitor 144 is carried out. When the reset operation in which the switch SW is closed by the reset circuit 170, the usually opened switch having been ON of the usually opened switches 145 to 147 turns OFF and the current source for overcharge delay is cut from the capacitor 144.

Next, referring FIG. 4, operation of the charge and discharge control circuit 102 shown in FIGS. 1 and 2 will be described. In the usual operation before time T1, the reset signal D is high level (See FIG. 3), and the switch SW is closed. When overcharge state generates at time T1, output A becomes high level. At this time, the reset signal becomes low level so as to open the switch SW. As the usually opened switch 145 becomes ON at the same time, the predetermined constant current I1 is supplied from the constant current source 141 to the capacitor 144. Therefore, charge voltage of the capacitor 144 rises, the delay output S is supplied to the second control circuit 160 from the voltage comparator 148 at T2 when the charge voltage exceeds the reference voltage Ve, and output A" too becomes high level.

As the result, the FET 113 becomes OFF, and at the same time, the reset signal D becomes high level so as to close the switch SW. The first control circuit 150 turns the usually opened switch 145 OFF responding to the reset signal D. As the result, voltage of the capacitor 144 becomes zero rapidly. However, as the overcharge state still lasts and output A is high level after T2, output A" too keeps high level.

When an overcurrent state occurs adding the overcharge state at time T3, output C becomes high level state and the switch 147 is closed by output C' (see FIG. 3.) At this time the switch SW is turned OFF by the reset signal D from the reset circuit 170. On the other hand, when voltage of the capacitor 144 begins to rise and exceeds the reference voltage Ve, output C" is output and the FET 112 is too turned OFF. FIG. 3 teaches that voltage of the capacitor reaches saturated state further rising after T4 as the reset signal D is low level state in this case. Therefore, both outputs C and C' are kept high level state.

According to the present invention, as delay time is supplied to each output of a plural of the detecting circuit formed in the charge and discharge control circuit only forming the delay circuit having one capacitor like as above-mentioned, numbers of capacitors and pins therefor are decreased, production cost goes down, and mounting area decreases.

What is claimed is:

1. A charge and discharge control circuit for controlling a charge and discharge of a secondary cell connected to an external power source terminal through a switch circuit by ON/OFF controlling the switch circuit, comprising:

an overcharge detcting circuit for detecting whether the secondary cell is in an overcharge state;

an overdischarge detecting circuit for detecting whether the secondary cell is in an overdischarge state;

an overcurrent detecting circuit for detecting whether overcurrent flows from the secondary cell to a load;

a delay circuit including plural current sources or a resistor and a single capacitor to obtain a selectively varying delay time in response to an external signal;

first control means for responding to each output of the overcharge detecting circuit, the overdischarge detecting circuit, and the overcurrent detecting circuit, and for operating the delay circuit so as to obtain a required delay output; and second control means for responding to the output of the first control means and the delay output from the delay circuit, and for outputting a control signal for ON/OFF controlling the switch circuit.

2. A charge and discharge control circuit for controlling a charge and discharge of a secondary cell connected to an external power source terminal through a switch circuit by ON/OFF controlling the switch circuit, comprising:

an overcharge detecting circuit for detecting whether the secondary cell is in an overcharge state;

an over-discharge detecting circuit for detecting whether the secondary cell is in an over-discharge state;

a delay circuit including plural current sources or a resistor and a single capacitor to obtain a selectively varying delay time in response to an external signal;

first control means for responding to each output of the overcharge detecting circuit and the over-discharge detecting circuit, and for operating the delay circuit so as to obtain a required delay output; and second control means for responding to the output of the first control means and the delay output from the delay circuit, and for outputting a control signal for ON/OFF controlling the switch circuit.

3. A charge and discharge control circuit for controlling a charge and discharge of a secondary cell connected to an external power source terminal through a switch circuit by ON/OFF controlling the switch circuit, comprising:

an overcharge detecting circuit for detecting whether the secondary cell is in an overcharge state;

an over-current detecting circuit for detecting whether over-current flows from the secondary cell to a load;

a delay circuit including plural current sources or a resistor and a single capacitor to obtain a selectively varying delay time in response to an external signal;

first control means for responding to each output of the overcharge detecting circuit and the over-current detecting circuit, and for operating the delay circuit so as to obtain a required delay output; and second control means for responding to the output of the first control means and the delay output from the delay circuit, and for outputting a control signal for ON/OFF controlling the switch circuit.

4. A charge and discharge control circuit for controlling a charge and discharge of a secondary cell connected to an external power source terminal through a switch circuit by ON/OFF controlling the switch circuit, comprising:

an over-discharge detecting circuit for detecting whether the secondary cell is in an over-discharge state;

an over-current detecting circuit for detecting whether over-current flows from the secondary cell to a load;

a delay circuit including plural current sources or a resistor and a single capacitor to obtain a selectively varying delay time in response to an external signal;

first control means for responding to each output of the over-discharge detecting circuit and the over-current detecting circuit, and for operating the delay circuit so as to obtain a required delay output; and second control means for responding to the output of the first control means and the delay output from the delay circuit, and for outputting a control signal for ON/OFF controlling the switch circuit.

* * * * *